(12) United States Patent
Linke et al.

(10) Patent No.: US 9,714,687 B2
(45) Date of Patent: Jul. 25, 2017

(54) METHOD AND DEVICE FOR INDICATING WEAR OF A BRAKE PAD IN A DISK BRAKE WITH AN ELECTRIC MOTOR ACTUATOR

(75) Inventors: Tobias Linke, Munich (DE); Markus Stoehr, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 2757 days.

(21) Appl. No.: 12/161,325

(22) PCT Filed: Jan. 18, 2007

(86) PCT No.: PCT/EP2007/000410
§ 371 (c)(1),
(2), (4) Date: Jun. 3, 2010

(87) PCT Pub. No.: WO2007/082743
PCT Pub. Date: Jul. 26, 2007

(65) Prior Publication Data
US 2010/0300816 A1    Dec. 2, 2010

(30) Foreign Application Priority Data
Jan. 18, 2006    (DE) .................. 10 2006 002 307

(51) Int. Cl.
*F16D 66/02* (2006.01)
*F16D 66/00* (2006.01)
*F16D 121/24* (2012.01)
*F16D 125/20* (2012.01)

(52) U.S. Cl.
CPC ......... *F16D 66/025* (2013.01); *F16D 66/026* (2013.01); *F16D 2066/003* (2013.01); *F16D 2121/24* (2013.01); *F16D 2125/20* (2013.01)

(58) Field of Classification Search
CPC ............. F16D 66/025; F16D 66/026; F16D 2066/003; F16D 2121/24; F16D 2125/20
USPC ......... 188/1.11 W, 1.11 L, 71.7, 71.8, 79.51; 340/454
See application file for complete search history.

(56) References Cited

U.S. PATENT DOCUMENTS

| 5,692,586 A | 12/1997 | Akamatsu et al. |
| 5,975,250 A | 11/1999 | Brandmeier et al. |
| 2004/0050635 A1* | 3/2004 | Bieker et al. ................. 188/381 |

FOREIGN PATENT DOCUMENTS

| DE | 195 34 854 A1 | 3/1997 |
| DE | 196 26 400 C1 | 12/1997 |
| DE | 199 10 048 A1 | 5/2000 |

OTHER PUBLICATIONS

English machine translation of DE 19910048.*
International Search Report dated Jun. 6, 2007 w/English translation (four (4) pages).

* cited by examiner

*Primary Examiner* — Pamela Rodriguez
(74) *Attorney, Agent, or Firm* — Crowell & Moring LLP

(57) ABSTRACT

A method and device are provided for indicating wear of at least one brake pad in a disc brake having an electric motor actuator. The method adds up wear adjustment travel paths of the electric motor actuator and/or of an adjustment motor, and indicates the sum of the wear adjustment paths so obtained as the wear of the brake pad or as a residual brake pad service life.

2 Claims, 3 Drawing Sheets

METHOD AND DEVICE FOR INDICATING WEAR OF A BRAKE PAD IN A DISK BRAKE WITH AN ELECTRIC MOTOR ACTUATOR

BACKGROUND AND SUMMARY OF THE INVENTION

The invention relates to a method for indicating the wear of at least one brake pad in a disc brake with an electric motor actuator, a device for performing this method and a corresponding disc brake.

As is known, brake pads are subject to wear. According to vehicle servicing instructions they should be regularly checked and changed after a specific degree of wear, before damage occurs to associated brake parts and a risk of accidents arises due to reduced or non-existent braking performance.

Consequently, hydraulically or pneumatically actuated disc brakes, for example, are equipped with a sensor in the form of a potentiometer, which registers a wear value of the brake pads and transmits this value as a proportional electrical voltage to a higher system. This system has a display, which indicates to the driver in good time when the brake pads are due to be changed. However, the known systems require an additional component for sensing the wear value, namely the sensor. Wear contacts indicating a brake pad wear limit are also known, which have the disadvantage that they need to be replaced when changing the brake pads.

All of these embodiments require additional parts, changing of which generates corresponding additional procurement and fitting costs, especially since brake pads need to be changed relatively often.

Disc brakes in which electric motor actuators act on a clamping device, in order to apply a force to the respective brake pads for a braking sequence, are already known. It is customary with these brakes for the electric motor actuator and/or an adjusting device with an additional adjustment motor to automatically adjust the brake pad as it wears.

The object of the present invention is to improve a method for indicating the wear of at least one brake pad in a disc brake with an electric motor actuator, in which the aforementioned disadvantages no longer occur.

A further object of the invention is to create a device for the method according to the invention, together with a disc brake including this device.

According to the invention, a method is provided for indicating the wear or residual brake pad thickness of at least one brake pad in a disc brake having an electric motor actuator. The method includes the steps of adding the wear adjustment travels of the electric motor actuator and/or of an adjustment motor; and indicating the sum of the wear adjustment travels thus obtained as the wear of the brake pad.

Further according to the invention, a device is provided for indicating the wear of at least one brake pad in a disc brake with an electric motor actuator. The device includes a comparator module for comparing positions of the electric motor actuator and/or of an adjustment motor; an adding module for adding the wear adjustment travels of the electric motor actuator and/or of an adjustment motor; a display module for displaying wear of the brake pad; and a control module for controlling the comparator module, the adding module and the display module and for transmitting control signals for reference adjustments of the electric motor actuator and/or of the adjustment motor to the brake control unit.

Advantageous developments are set forth herein.

It is of particular advantage that the invention does not require any additional sensors or components. An outstanding feature of the method according to the invention is that it uses existing components to determine any wear of brake pads of the disc brake.

It is particularly advantageous if the electric motor actuator of the disc brake, which may also be of the self-energizing type, is used to determine the brake pad wear, since this actuator is designed as a positioning or servomotor, in such a way that the position of its driven shaft is registered in order to control it. These position values are available in an associated brake control unit and can advantageously be used in order to determine any wear of the brake pads.

A method according to the invention for indicating the wear of at least one brake pad in a disc brake with an electric motor actuator comprises the following steps: (i) adding of the wear adjustment travels of the electric motor actuator and/or of an adjustment motor; and (ii) indicating the sum of wear adjustment travels thus obtained as the wear of at least one brake pad.

Where necessary, the wear value(s) may advantageously be transmitted to a higher system (central brake system control/instrument) for further display to the driver. The display is then undertaken by another system (instrument, dashboard) and the brake system supplies the information (for example, via CAN, LIN).

This is particularly advantageous, since in the case of an automatic wear adjustment corresponding values for the adjustment are already available in a higher system, for example in the brake control unit, and can also be evaluated for displaying the wear.

For this purpose, in one embodiment the wear adjustment travel is determined through a position of the electric motor actuator and/or of the adjustment motor. This is especially easy owing to the existence of position values for controlling such a motor. This is easily done by defining the position of the electric motor actuator and/or of the adjustment motor in relation to a reference position. These data values are available in digital form in the brake control unit. They can advantageously be evaluated by simple processing, for example through software instructions.

It is furthermore advantageous that in a preferred development the reference position is assumed at predefined intervals in order to avoid a loss of position. This represents an easy way of confirming or correcting the current position value of the electric motor actuator.

In a further embodiment the wear adjustment travel of the electric motor actuator is determined by the following subroutines:

(1.1) registering of a first position prior to a closing movement of the brake pad;

(1.2) registering of a second position after lifting or return of the brake pad;

(1.3) determination of the wear adjustment travel through comparison of the first position with the second position, the lift or return of the brake pad occurring over a constant travel.

With the aid of the position values for the actuator, it is thereby easy to determine the wear adjustment travel for the wear value. This is particularly advantageous if no suitable value is available for further processing in the brake control unit.

In a preferred embodiment the wear adjustment travel is determined at predefined intervals as a function of a time and/or operating parameter of the disc brake. The wear value can therefore be determined with sufficient continuity over time. In a further development this moreover allows a continuous display of the wear of the brake pad and/or a display for a change of brake pad in step two of the method.

A device according to the invention for indicating the wear of at least one brake pad in a disc brake with an electric motor actuator includes the following: (i) a comparator module for comparing positions of the electric motor actuator and/or of an adjustment motor; (ii) an adding module for adding the wear adjustment travels of the electric motor actuator and/or of an adjustment motor; (iii) a display module for displaying brake pad wear; and (iv) a control module for controlling the comparator module, the adding module and the display module and for transmitting control signals relating to reference adjustments of the electric motor actuator and/or of the adjustment motor to the brake control unit.

In a further embodiment the device has at least one position sensor to provide a reference position for the positions of the electric motor actuator and/or of the adjustment motor. The respective motor can thereby undertake a reference travel to a fixed reference point, which in the closing device, for example, takes the form of a limit switch.

It is advantageous that in a preferred embodiment the comparator module, the adding module and the control module are integral parts of the brake control unit. Since these modules may be embodied as software, they can advantageously be implemented simply without additional components and without additional fitting costs in a brake control unit.

In another development, the electric motor actuator and/or the adjustment motor are equipped with a position-detecting transducer. This caters even for situations in which the actuator and the adjustment motor do not permit precise detection of the position because they are of simple construction. This therefore advantageously extends the sphere of application of the invention.

A disc brake according to the invention with electric motor actuator and indication of the wear of at least one brake pad includes the device according to the invention for performing the method according to the invention.

BRIEF DESCRIPTION OF THE DRAWINGS

The invention will be explained in more detail with reference to the exemplary embodiments specified in the schematic figures of the drawing, in which.

DETAILED DESCRIPTION OF THE DRAWINGS

Figure 1:
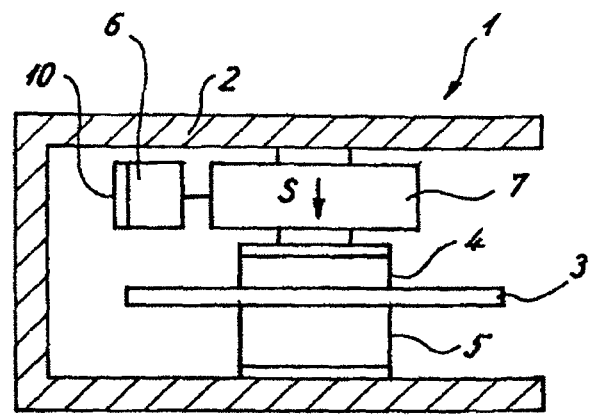
FIG. 1 is a schematic diagram of a first embodiment of a disc brake according to the invention.

The same reference numerals apply to parts having the same or a similar function.

FIG. 1 shows a schematic diagram of a first embodiment of a disc brake 1 according to the invention. A first brake pad 4 and a second brake pad 5 are arranged on either side of a brake disc 3. A brake caliper 2 encloses the brake pads 4 and 5 and the brake disc 3. Inside the caliper, the second brake pad 5 is supported on one side (in this case, the lower side), whilst on the other side (in this case the upper side) the first brake pad 4 is supported against the brake caliper 2 by way of a clamping device 7. This may be a floating caliper, but the invention is not limited to this example.

The clamping device 7 is connected to an electric motor actuator 6. In this example, the electric motor actuator 6 is a servomotor, which has its own first transducer 10, the first transducer 10 transmitting information proportional to the angular position of the driven shaft of the actuator 6 via an electrical connection (not shown) to a higher brake control unit 21, likewise not shown here (see FIG. 4). The electric motor actuator 6 is connected via an electrical connection (not shown) to the brake control unit 21 (see FIG. 4), via which it is supplied with electrical power.

The clamping device 7 is embodied as a transmission mechanism, for example, which converts the rotational movement of the electric motor actuator 6 into a linear movement in the direction of travel shown by an arrow S towards the brake disc 3. In the process, a so-called clamping force is applied, braking the rotation of the brake disc 3 and consequently that of the vehicle wheel connected thereto.

Figure 2:
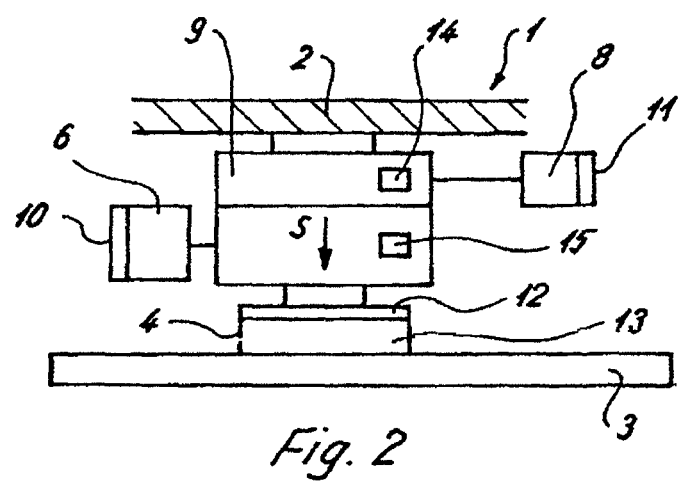
FIG. 2 is a schematic diagram of a second embodiment of a disc brake according to the invention.

In each braking sequence, a layer 13 of the pad material arranged on a carrier 12, as is shown in FIG. 2, is subjected to stress in braking the rotation of the brake disc 3 and is, to a certain extent, worn away. The travel S required for application of the brake pads 4, 5 is thereby increased. In order to compensate for this travel, an automatic adjustment is made by the electric motor actuator 6, which is controlled by the brake control unit 21 on the basis of position measurements of the adjustment travel of the actuator 6 relative to a fixed reference, which will not be further explained.

FIG. 2 shows a second embodiment of the disc brake 1 according to the invention, in which such a wear adjustment is performed by an additional adjustment motor 8, which is interactively coupled to an associated adjustment mechanism 9. The adjustment mechanism 9 is arranged in the force path of the clamping device 7 and therefore within the direction of travel S.

An extended adjustment travel, which is caused by the wearing of the wear layer 13 of the first brake pad 4 (only one of which is shown here for reasons of clarity) and which is needed in order to press the brake pad 4 on to the brake disc 3 is compensated for by the adjustment mechanism 9, driven by the adjustment motor 8.

The adjustment mechanism 9 may be a wedge mechanism, which is adjusted by the adjustment motor 8 by way of a spindle-nut mechanism. The adjustment motor 8 in this example also has a second transducer for detecting the angular position of the driven shaft of the adjustment motor 8 and therefore the extent of the adjustment.

Figure 4:
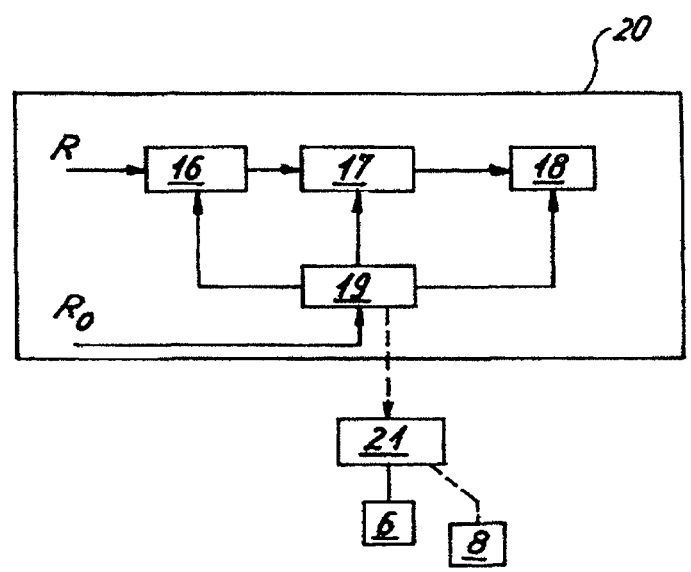
FIG. 4 is an exemplary block diagram of a device according to the invention.

The adjustment by the adjustment motor 8 is likewise undertaken by the brake control unit 21, to which it is electrically connected in the same way as the electric motor actuator 6 (not shown, see FIG. 4).

The adjustment works, for example, in that the brake control unit 21 detects an increased adjustment travel for clamping the brake pad 4 from the measured values supplied by the first transducer 10, and via the adjustment motor, with the aid of the second transducer 11, compensates for this additional adjustment travel by adjusting the adjustment mechanism.

Two position sensors 14, 15, which are embodied as limit switches, for example, are arranged in the mechanisms 7 and 9 as references, which serve as reference gauges for measurement of the adjustment travels. The sensors may be simply actuated in specific positions by components of the mechanisms 7 and 9, for example, and transmit a switch pulse for reference formation to the brake control unit 21 via the common electrical connection thereto.

According to the invention, the position values of the electric motor actuator 6, for example, are used to determine the wear of the brake pads 4, 5. A combination together with the adjustment motor 8 is also possible, or with the adjustment motor 8 alone.

Figure 3:
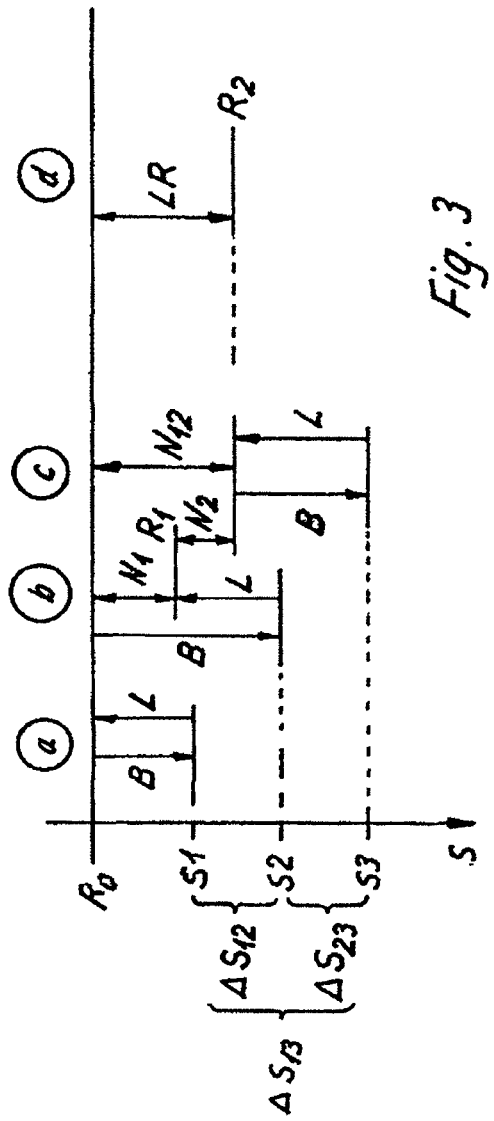
FIG. 3 is a diagram explaining how wear travel is determined on a brake pad.

By reference to FIG. 3, which is a diagrammatic representation explaining how the wear travel is determined on a brake pad 4, it will now be shown how, according to the invention, the wear of the brake pad 4 is determined and processed for display.

In accordance with the direction of the travel S in FIGS. 1 and 2, this is now plotted in the same direction downward from a reference position Ro in FIG. 3. This reference position Ro is formed, for example, by the position sensor 14, 15, which is assumed as starting position when new brake pads are fitted.

Consideration will first be given to situation "a". On braking for the first time, the brake pad 4 performs a closing movement B towards the brake disc 3 (FIGS. 1, 2) by a travel denoted by the designation S1. After braking, the brake pad 4 is released or lifted, a lift L by a specific travel occurring back toward the starting position, in this case reference position Ro. The travel S1 is proportional to an angle of rotation of the electric motor actuator 6 or of the adjustment motor 8. These motors 6 and 8 can therefore be precisely set and regulated in respect to the angle of rotation of their driven shafts.

If the wear layer of the brake pad 4 has now been worn away by a certain amount after some braking sequences, a larger travel has to be covered in order to achieve braking after the travel S2. This is shown by situation "b". The travel involved in a closing movement B has here increased to the travel S2 as a result of the wear $\Delta S_{12}$. An adjustment of the electric motor actuator 6, for example, now occurs to a new starting position R1, which is distanced from the reference position Ro by the wear adjustment travel $N_1$. This wear adjustment travel $N_1$ is a measure of the wear $\Delta S_{12}$ of the brake pad 4 relative to the reference position Ro. After braking the brake pad 4 is again lifted by the same amount L, so that the new starting position R1 is attained.

The starting position R1 and the reference position Ro each correspond to specific angles of the driven shaft of the electric motor actuator 6, which is available in the brake control unit 21 and which therefore also lends itself to further processing. For example, the difference R1–Ro is equal to the wear adjustment travel $N_1$.

In situation "c" a greater wear $\Delta S_{23}$ has resulted. The closing movement B has to be increased to the travel S3. An associated wear adjustment travel $N_2$ results from the difference between a new starting position R2 and the old starting position R1. The total wear adjustment travel $N_{12}$ is obtained as the sum of the two wear adjustment travels $N_1$ and $N_2$.

In this way, in situation "c" a total wear $\Delta S_{13}$ is obtained by adding the individual wear adjustment travels N, which are available as data values in the brake control unit 21. This sum may be displayed to the driver as a complete sum in the form of an ultimate wear value, as will be described in more detail below. It is also possible, however, to represent the individual wear adjustment travels as a quasi continuous wear display.

Serving for a plausibility check on the various starting positions R1, R2 in situation "d" is a lift reference travel LR, which can in each case be performed from a starting position R1, R2 to the reference position Ro, in order to avoid positional inaccuracies. This so-called "reference travel" can be performed by the actuator 6 or the adjustment motor 8 whenever braking is not required.

As an alternative to the wear display, the remaining service life (residual brake pad thickness) can also be derived from the data.

FIG. 4 is an exemplary block diagram of a device 20 according to the invention. It includes a comparator module 16, an adding module 17 which is connected to the former and to which a display module 18 is connected. All of these modules 16, 17, 18 are connected to a control instrument 19.

At its input, the comparator module 16 receives the respective data values for the motor positions R, which it compares with one another in order to determine the wear adjustment travels N, which are then added in the adding module 17 to obtain the total wear adjustment travel N, which is displayed to the driver on the display module 18 as a measure of the ultimate wear value.

The control module 19 controls these modules 16, 17, 18 incorporating the reference position Ro, and is also connected to the brake control unit 21, in order to trigger reference travels of the motors 6, 8, as is represented by the dashed line.

This is only one possible example of a device according to the invention, in which the motor positions R are evaluated. Instead of these positions, an input directly into the adding module 17 is possible, which is not shown. In this case the wear adjustment travels N are supplied or can be polled by the brake control unit 21.

In a preferred development, the device 20 is an integral part of the brake control unit 21, preferably of its software.

With the method according to the invention, which can be performed by the device according to the invention, an existing electric motor actuator 6 is used for the clamping force and/or an adjustment motor 8 as the sensor for the wear adjustment. The data values are transmitted from the motor 6, 8 to the brake control unit 21 and to the display module 18 via a communications interface, such as CAN, LIN or Flexray, for example.

The disc brake according to the invention has the following advantages: (i) no expensive position sensors; (ii) existing components are used; (iii) transmission of data values via existing bus systems and interfaces; (iv) no changing of components (so-called brake pad wear chips) when replacing brake pads; (v) easy implementation of the device as software in existing brake control unit; (vi) reference position and/or inexpensive position sensor affords protection against loss of position; and (vii) continuous and/or ultimate wear display.

Although the present invention has been described above with reference to preferred exemplary embodiments, it is not limited to these but can be modified in many different ways.

For example, the driver display may be embodied as a continuous display, in which scheduled time intervals for the processing of position values are so small that a continuous display is possible, for example in the form of a bar graph display or the like.

Motors may also be equipped with additional transducers, in order to increase the accuracy, for example.

It is also possible, via suitable interfaces, to plot the course of the brake pad wear in a so-called black box for the purpose of accident reconstruction.

| Table of Reference Numerals | |
|---|---|
| 1 | disc brake |
| 2 | brake caliper |
| 3 | brake disc |
| 4 | first brake pad |
| 5 | second brake pad |
| 6 | electric motor actuator |
| 7 | clamping device |
| 8 | adjustment motor |
| 9 | adjustment mechanism |
| 10 | first transducer |
| 11 | second transducer |
| 12 | carrier |
| 13 | wear layer |
| 14 | first position sensor |
| 15 | second position sensor |
| 16 | comparator module |
| 17 | adding module |
| 18 | display module |
| 19 | control module |
| 20 | device |
| 21 | brake control unit |
| B | closing movement |
| L | lift |
| LR | lift reference travel |
| $N, N_1, N_2, N_{12}$ | wear adjustment travel |
| R, R1, R2 | position |
| Ro | reference position |
| $S, S_1, S_2, S_3$ | travel |
| $\Delta S_{12}, \Delta S_{13}, \Delta S_{13}$ | wear |

The invention claimed is:

1. A method for indicating wear or residual brake pad thickness of at least one brake pad in a disc brake having an electric motor actuator for performing braking of the disc brake, the method comprising the acts of:

determining wear adjustment travels of the electric motor actuator through position of the electric motor actuator;

adding the wear adjustment travels of the electric motor actuator;

indicating the wear or residual brake pad thickness of the at least one brake pad based on a sum of the wear adjustment travels, wherein determining the wear adjustment travel further comprises the acts of:

registering a first position prior to a closing movement of the brake pad;

registering a second position after a lifting of the brake pad; and comparing the first position with the second position, wherein the lift of the brake pad occurs over a constant travel, to determine the wear adjustment travel.

2. The method according to claim 1, wherein the wear adjustment travel is determined at predefined intervals as a function of at least one of time and an operating parameter of the disc brake.

* * * * *